(12) United States Patent
Olsson et al.

(10) Patent No.: US 9,134,548 B1
(45) Date of Patent: Sep. 15, 2015

(54) RETENTION MEMBER FOR A LENS SYSTEM

(71) Applicant: Google Inc., Mountain View, CA (US)

(72) Inventors: Maj Isabelle Olsson, San Francisco, CA (US); Matthew Wyatt Martin, Ross, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/630,444

(22) Filed: Sep. 28, 2012

(51) Int. Cl.
*G02C 9/00* (2006.01)
*G02C 7/08* (2006.01)

(52) U.S. Cl.
CPC .......................................... *G02C 9/00* (2013.01)

(58) Field of Classification Search
USPC ................ 351/155, 47, 57, 58, 124
See application file for complete search history.

(56) References Cited

U.S. PATENT DOCUMENTS

| | | |
|---|---|---|
| 792,763 A | 6/1905 | Eccleston |
| 1,025,124 A | 5/1912 | Corbett |
| D80,311 S | 1/1930 | Helm |
| D136,048 S | 7/1943 | Schmid |
| 2,337,617 A | 12/1943 | Miller, Jr. |
| D167,526 S | 8/1952 | Murphy |
| D193,872 S | 10/1962 | Petitto et al. |
| 3,414,350 A | 12/1968 | McNeill |
| D215,032 S | 8/1969 | Huggins |
| D219,755 S | 1/1971 | Bloch |
| 3,600,069 A | 8/1971 | McNeill |
| 3,701,591 A | 10/1972 | Wichers |
| 3,944,344 A | 3/1976 | Wichers |
| 4,240,718 A | 12/1980 | Wichers |
| D267,724 S | 1/1983 | Staller |
| 4,400,067 A | 8/1983 | Joffe |
| D274,181 S | 6/1984 | Abate et al. |
| D280,994 S | 10/1985 | Abate |
| 4,867,550 A | 9/1989 | Jannard |
| 4,867,551 A | 9/1989 | Perera |
| 4,998,815 A | 3/1991 | Lin |
| D320,289 S | 9/1991 | Blackstone |
| D327,079 S | 6/1992 | Allen |
| 5,159,359 A | 10/1992 | Pauly et al. |
| D331,763 S | 12/1992 | Jannard |
| D334,557 S | 4/1993 | Hunter et al. |
| D337,320 S | 7/1993 | Hunter et al. |
| D346,813 S | 5/1994 | McAlpin |
| D354,969 S | 1/1995 | Garcia |
| D354,974 S | 1/1995 | Wielhouwer |
| D356,286 S | 3/1995 | Shink |

(Continued)

FOREIGN PATENT DOCUMENTS

WO 20100092904 A1 8/2010

OTHER PUBLICATIONS

International Search Report and Written Opinion for Application No. PCT/US2013/029019 dated Jun. 3, 2013.

(Continued)

*Primary Examiner* — Jack Dinh
(74) *Attorney, Agent, or Firm* — Lerner, David, Littenberg, Krumholz & Mentlik, LLP

(57) ABSTRACT

According to aspects of the disclosure, a lens system may include lenses and a retention member. The lenses may be removably secured to a lens mounting surface of the retention member by one or more fixation elements. The retention member may also include a channel to receive a headband portion of a head wearable device.

21 Claims, 7 Drawing Sheets

(56) References Cited

U.S. PATENT DOCUMENTS

| | | |
|---|---|---|
| 5,469,229 A | 11/1995 | Greenbaum |
| D366,888 S | 2/1996 | Locquiao |
| 5,533,207 A | 7/1996 | Diaz |
| 5,539,422 A | 7/1996 | Heacock et al. |
| 5,546,140 A | 8/1996 | Underwood |
| D375,111 S | 10/1996 | Wielhouwer |
| 5,729,321 A | 3/1998 | Wielhouwer |
| D401,960 S | 12/1998 | Pearl |
| D402,651 S | 12/1998 | Depay et al. |
| 5,953,096 A | 9/1999 | Friedman |
| 6,007,199 A | 12/1999 | Yang |
| 6,023,372 A | 2/2000 | Spitzer et al. |
| 6,034,653 A | 3/2000 | Robertson et al. |
| D428,620 S | 7/2000 | Maturaporn |
| D429,253 S | 8/2000 | Robertson et al. |
| D431,042 S | 9/2000 | Lin |
| D436,960 S | 1/2001 | Budd et al. |
| 6,747,611 B1 | 6/2004 | Budd et al. |
| 6,779,886 B2 | 8/2004 | Huang |
| 6,945,648 B2 | 9/2005 | Schindler et al. |
| D512,985 S | 12/2005 | Travers et al. |
| D513,025 S | 12/2005 | Canavan |
| D527,752 S | 9/2006 | Canavan et al. |
| D533,572 S | 12/2006 | Howard et al. |
| D533,893 S | 12/2006 | Canavan et al. |
| 7,158,096 B1 | 1/2007 | Spitzer |
| D537,078 S | 2/2007 | Tanaka et al. |
| 7,219,993 B1 | 5/2007 | Chiou |
| D544,896 S | 6/2007 | Lee |
| 7,284,853 B2 | 10/2007 | Friedman |
| D559,250 S | 1/2008 | Pombo |
| 7,322,691 B2 | 1/2008 | Xie |
| D565,082 S | 3/2008 | McClure et al. |
| D566,744 S | 4/2008 | Travers et al. |
| 7,360,889 B2 | 4/2008 | Yong |
| D571,838 S | 6/2008 | Yee |
| D574,025 S | 7/2008 | Yee |
| D578,120 S | 10/2008 | Lowe et al. |
| 7,470,022 B2 | 12/2008 | Lerner |
| 7,475,981 B2 | 1/2009 | Yong |
| 7,517,082 B2 | 4/2009 | Huang |
| D593,146 S | 5/2009 | Powless |
| D602,064 S | 10/2009 | Mitsui et al. |
| 7,600,871 B2 | 10/2009 | Lane et al. |
| 7,631,968 B1 | 12/2009 | Dobson et al. |
| 7,648,236 B1 | 1/2010 | Dobson |
| 7,663,805 B2 | 2/2010 | Zaloum et al. |
| 7,675,683 B2 | 3/2010 | Dobson et al. |
| D616,485 S | 5/2010 | Thixton |
| D616,486 S | 5/2010 | Carlow et al. |
| 7,753,520 B2 | 7/2010 | Fuziak, Jr. |
| D622,303 S | 8/2010 | Thixton |
| 7,782,589 B2 | 8/2010 | Menduni et al. |
| 7,843,403 B2 | 11/2010 | Spitzer |
| D636,809 S | 4/2011 | Hwang et al. |
| 8,000,000 B2 | 8/2011 | Greenberg et al. |
| D645,492 S | 9/2011 | Zhao |
| D646,316 S | 10/2011 | Zhao |
| D647,123 S | 10/2011 | Cho |
| 8,029,132 B1 | 10/2011 | Park |
| D649,177 S | 11/2011 | Cho et al. |
| D658,812 S | 5/2012 | Miller, IV et al. |
| D659,137 S | 5/2012 | Matsumoto |
| D659,739 S | 5/2012 | Olsson et al. |
| D659,741 S | 5/2012 | Heinrich et al. |
| D660,341 S | 5/2012 | Olsson et al. |
| D662,964 S | 7/2012 | Olsson et al. |
| D662,966 S | 7/2012 | Jeon |
| D662,968 S | 7/2012 | Bogle |
| D664,184 S | 7/2012 | Olsson et al. |
| D664,185 S | 7/2012 | Heinrich et al. |
| D664,586 S | 7/2012 | Olsson |
| D664,587 S | 7/2012 | Cho et al. |
| D666,237 S | 8/2012 | Olsson et al. |
| D669,066 S | 10/2012 | Olsson et al. |
| D671,589 S | 11/2012 | Olsson |
| D671,590 S | 11/2012 | Klinar et al. |
| D673,996 S | 1/2013 | Kim et al. |
| D677,710 S | 3/2013 | Cho |
| D680,152 S | 4/2013 | Olsson et al. |
| D684,321 S | 6/2013 | Gill |
| D687,087 S | 7/2013 | Iurilli |
| D687,828 S | 8/2013 | Sato et al. |
| D688,294 S | 8/2013 | Roy et al. |
| 8,542,326 B2 | 9/2013 | MacNaughton et al. |
| D691,602 S | 10/2013 | Sugihara et al. |
| D692,424 S | 10/2013 | Pombo et al. |
| D697,962 S | 1/2014 | Olsson |
| D698,383 S | 1/2014 | Hong |
| 8,622,542 B2 | 1/2014 | Takahashi |
| D701,506 S | 3/2014 | Pombo |
| D703,724 S | 4/2014 | Olsson |
| D704,705 S | 5/2014 | Mehin et al. |
| D706,859 S | 6/2014 | Markovitz et al. |
| D709,122 S | 7/2014 | Markovitz et al. |
| D710,928 S | 8/2014 | Heinrich et al. |
| D711,375 S | 8/2014 | Lee et al. |
| D711,376 S | 8/2014 | Lee et al. |
| D712,451 S | 9/2014 | Kim |
| 8,894,200 B2 | 11/2014 | Jirsa et al. |
| D718,804 S | 12/2014 | Treger et al. |
| 2001/0055093 A1 | 12/2001 | Saitoh et al. |
| 2002/0021407 A1 | 2/2002 | Elliott |
| 2005/0219152 A1 | 10/2005 | Budd et al. |
| 2005/0237271 A1 | 10/2005 | Yamamoto |
| 2006/0158608 A1 | 7/2006 | Lin |
| 2007/0046891 A1 | 3/2007 | Niu |
| 2007/0052672 A1 | 3/2007 | Ritter et al. |
| 2008/0143951 A1 | 6/2008 | Won |
| 2008/0169998 A1 | 7/2008 | Jacobsen et al. |
| 2008/0198324 A1 | 8/2008 | Fuziak |
| 2009/0066863 A1 | 3/2009 | Chen |
| 2009/0201460 A1 | 8/2009 | Blum et al. |
| 2010/0045928 A1 | 2/2010 | Levy |
| 2010/0073262 A1 | 3/2010 | Matsumoto |
| 2010/0110368 A1 | 5/2010 | Chaum |
| 2010/0149073 A1 | 6/2010 | Chaum et al. |
| 2010/0157433 A1 | 6/2010 | Mukawa et al. |
| 2010/0188314 A1 | 7/2010 | Miyake et al. |
| 2011/0012814 A1 | 1/2011 | Tanaka |
| 2011/0213664 A1 | 9/2011 | Osterhout et al. |
| 2012/0218507 A1 | 8/2012 | Calilung et al. |
| 2013/0044042 A1 | 2/2013 | Olsson et al. |
| 2013/0188080 A1 | 7/2013 | Olsson et al. |

OTHER PUBLICATIONS

International Search Report for Application No. PCT/US2014/016030 dated May 27, 2014.

RETENTION MEMBER FOR A LENS SYSTEM

BACKGROUND

Personal video or image displays are devices that are used to display an image received from a source for viewing by a single user. Such devices can be in the form of head-mounted displays that are worn on the head of a user and include one or more image sources over or in front of the user's eyes. Head-mounted displays can include an image source positioned adjacent and associated with each eye of the user or wearer and can be configured to present the same image, viewable as a single two-dimensional image. Alternatively, some such devices can be configured to present different stereoscopic images that are interpreted by the viewer as a single three-dimensional image. Regardless of the type of image presented to the user, such devices are usually blacked-out. That is, they almost entirely obstruct the wearer's vision outside of the screen or other image source included therein so that the user can see nothing but the image presented by the device's display system.

Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms. Additionally, some displays may not be easily configured for persons with ocular diseases or disorders, such as those persons who require corrective lenses or who otherwise desire to use such displays in conjunction with lenses configured to provide protection, either in the form of physical or UV protection. In these instances, some displays may not cooperate with such corrective or protective lenses, thereby causing a person to wear the display without the benefits associated therewith. In this scenario, the person may have difficulty resolving the images being presented by the displays or may otherwise be vulnerable to injury or damage from UV exposure.

BRIEF SUMMARY

Aspects of the disclosure may include a lens system including a retention member. The retention member may include a lens mounting surface including an aperture formed therethrough, the lens mounting surface extending between a first side surface and a second surface and being convexly curved with respect to a plane intersecting the first side surface and the second surface. The retention member may also include a channel defined in part by a first sidewall, a second sidewall, and a third sidewall, wherein the first sidewall and third sidewall are opposed to each other and the second sidewall is convexly curved with respect to the plane intersecting the first side surface and the second side surface. The lens system may include a lens contacting the lens mounting surface and removably attached to the retention member at the aperture.

According to one aspect, the aperture may further include a plurality of apertures.

According to one aspect, each of the plurality of apertures may be disposed at an equal distance from a respective one of the first side surface and the second side surface.

According to one aspect, a portion of the first sidewall may be substantially planar.

According to one aspect, a portion of the third sidewall may be substantially planar.

According to one aspect, the portions of the first and third sidewall that are substantially planar may be substantially parallel to each other.

According to one aspect, the retention member may further include an insert disposed at least partially within the channel.

According to one aspect, the retention member may further include a lip adjacent to one of the first sidewall and the third sidewall.

According to one aspect, the lip may be convex with respect to a plane extending through the first side surface and the second side surface.

According to one aspect, one of the first sidewall and the third sidewall may include a projection such that an opening distance between the first sidewall and third sidewall is at a minimum at a location along the projection.

According to one aspect, the lens mounting surface may be configured to extend along a surface of the lens in continuous contact therewith.

According to one aspect, the system may be configured for assembly with a head wearable device having a band, the system being configured for such assembly by attachment of the retention member to the band such that a portion of the band is received with the channel of the retention member.

According to one aspect, the head wearable device may further include a display attached to the band, and wherein the lens is positionable between an eye of a user and the display when the head wearable device is being worn by a user.

According to one aspect, the display may be affixed to the band by an extension arm attached between the band and the display, and wherein the lens may further include a cutout portion configured to at least partially surround the extension arm.

According to one aspect, the band may include a central portion disposed therealong with two side arms extending laterally therefrom, and wherein the retention member is configured to receive the band at the central portion.

According to one aspect, the central portion may include an inner surface that is curved in a direction of the side arms, and wherein the second sidewall of the channel of the retention member may be convexly curved so as to match the curve of the inner surface of the band when the band is received within the channel.

According to one aspect, the central portion may include a nosepiece depending therefrom, wherein the head wearable device includes a display attached to one of the side arms of the band, and wherein the lens is positionable between the nosepiece and the display when the retention member is attached with the band.

According to one aspect, the system may further include a fixation element configured to be received within the aperture to secure the lens to the lens mounting surface.

Another aspect of the disclosure may include a retention member for a lens system, including a lens mounting surface including an aperture formed therethrough, the lens mounting surface extending between a first side surface and a second surface and being convexly curved with respect to a first plane normal to the aperture. The retention member may also include a channel defined in part by a first sidewall, a second sidewall, and a third sidewall, wherein the first sidewall and third sidewall are opposed to each other and the second sidewall is convexly curved with respect to the first plane.

According to one aspect, the retention member may be configured for removable attachment with a lens using the aperture thereof and such that that lens contacts the lens mounting surface, the retention member further configured to attach to a head wearable device having a band, the retention member being configured for such attachment such that a portion of the band is received with the channel of the retention member.

According to one aspect, the band may include a central portion disposed therealong with two side arms extending laterally therefrom, and wherein the channel of the retention member is configured to receive the band at the central portion.

DETAILED DESCRIPTION

According to aspects of the disclosure, a lens system may include lenses and a retention member. The lenses may be removably secured to a lens mounting surface of the retention member by one or more fixation elements. The retention member may also include a channel to receive a headband portion of a head wearable device.

Figure 1A:
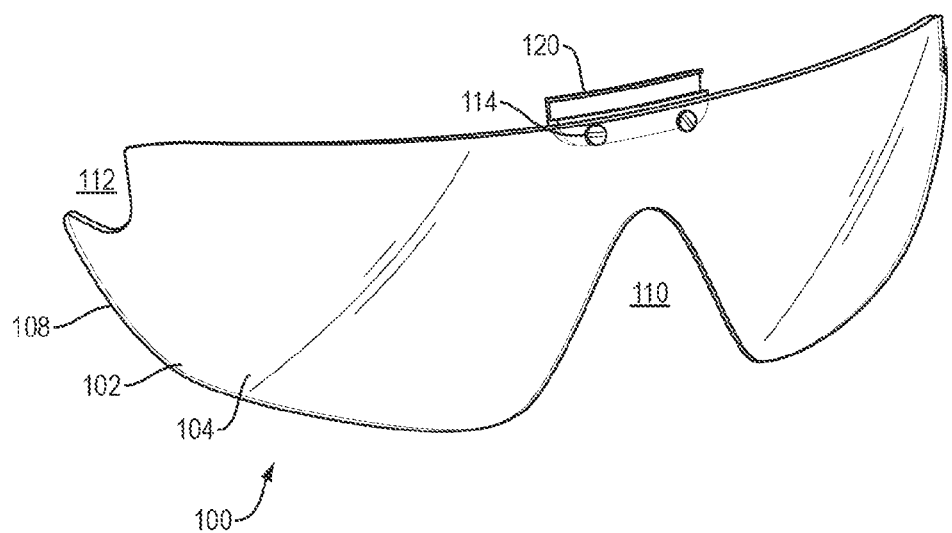
FIGS. 1A and 1B illustrate a front perspective view and rear perspective view of a lens system 100 according to one aspect of the disclosure.
Figure 1B:
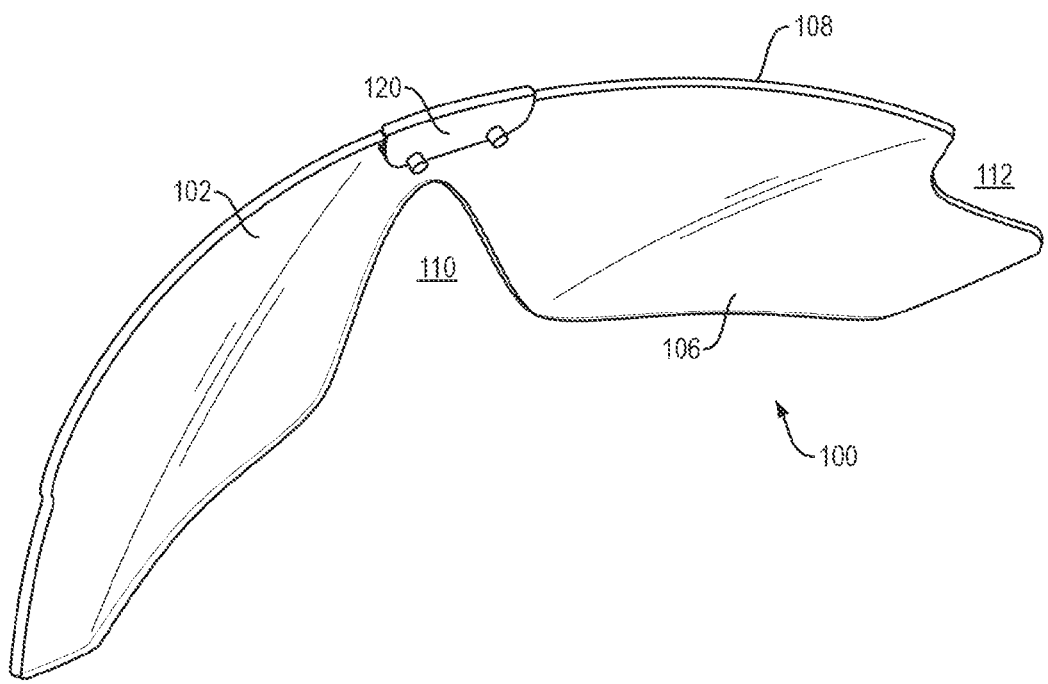

FIGS. 1A and 1B illustrate a front perspective view and rear perspective view of a lens system 100 according to one aspect of the disclosure. The lens system 100 may include lenses 102. The lenses 102 may be formed as a unitary lens or may be formed as a pair of lenses attached to one another. The lenses 102 may have two lens surfaces 104 and 106. In one example, lens surface 104 may be a front lens surface and lens surface 106 may be a rear lens surface. In this example, the rear lens surface may face the eye of a user when worn by the user, while the front lens surface may oppose the rear lens surface. The lenses 102 may also have an edge surface 108 that defines a perimeter and an overall shape of the lenses 102. In one example, the edge surface 108 may have a coating layer formed thereon, which can include, for example a polymeric material. The perimeter of the lenses 102 may define a nose region 110 and one or more cutout regions 112. The nose region 110 may be a space defined by the perimeter of the lenses 102 to receive the nose of a user when worn by a user. The cutout regions 112 may be a space defined by the perimeter of the lenses 102 to accommodate an extension arm for a display element, which will be explained in greater detail below. The lenses 102 may be polarized or tinted to provide a user with protection from excess sunlight, UV rays, and the like. The lenses may also be configured to account for one or more ocular disorders, such as nearsightedness, farsightedness, etc.

The lens system 100 may also include a retention member 120 removably coupled to the lenses 102 by one or more fixation elements 114. The lenses 102 may have one or more apertures (not shown), which may align with corresponding apertures 132 in the retention member 120, formed therethrough to receive the fixation elements 114. The retention member 120 may allow the lens system 100 to be coupled to a head-wearable device, as will be explained in greater detail below.

Figure 2A:
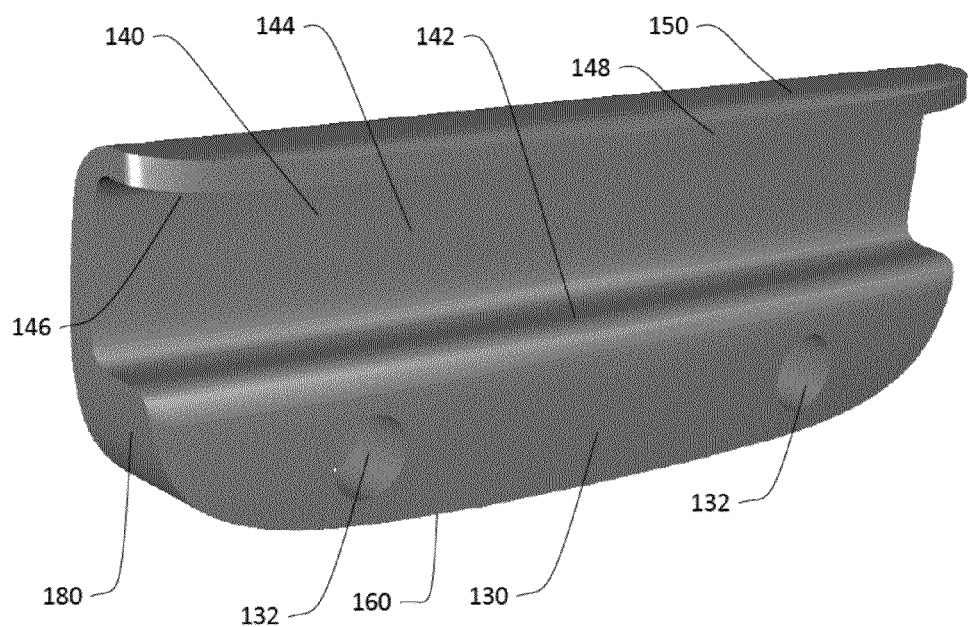
FIGS. 2A-C illustrate a front perspective view, side view, and rear perspective view of a retention member 120 according to one aspect of the disclosure.
Figure 2B:
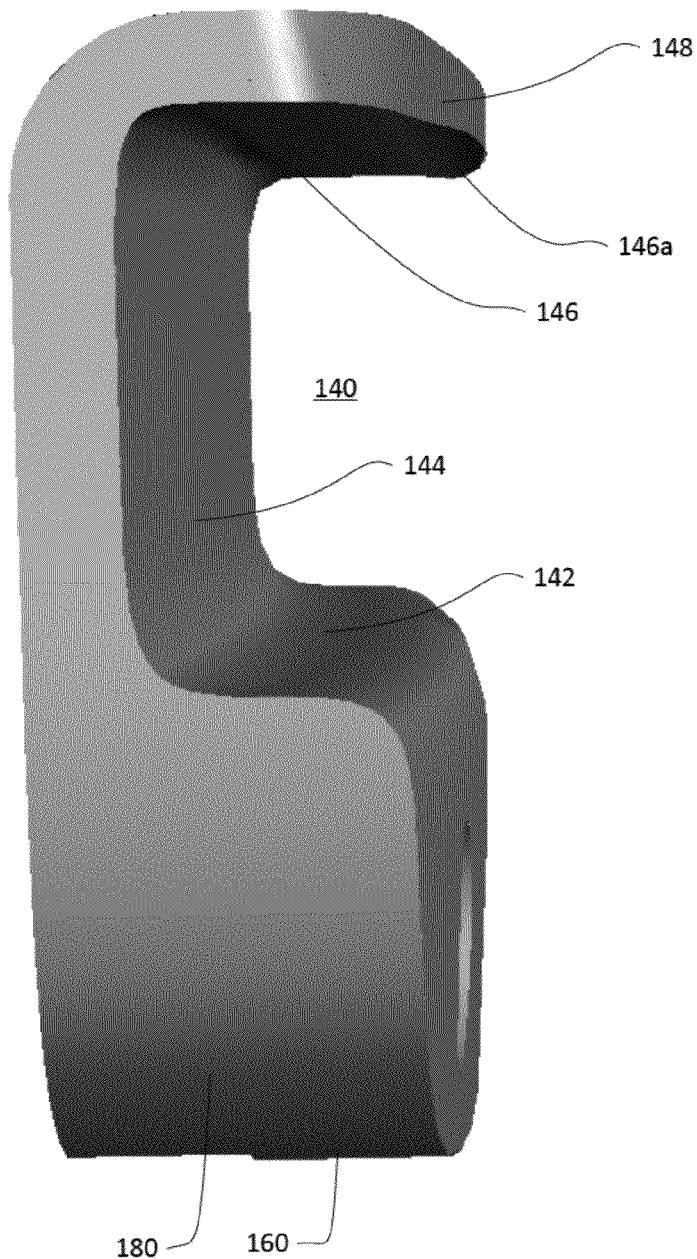
Figure 2C:
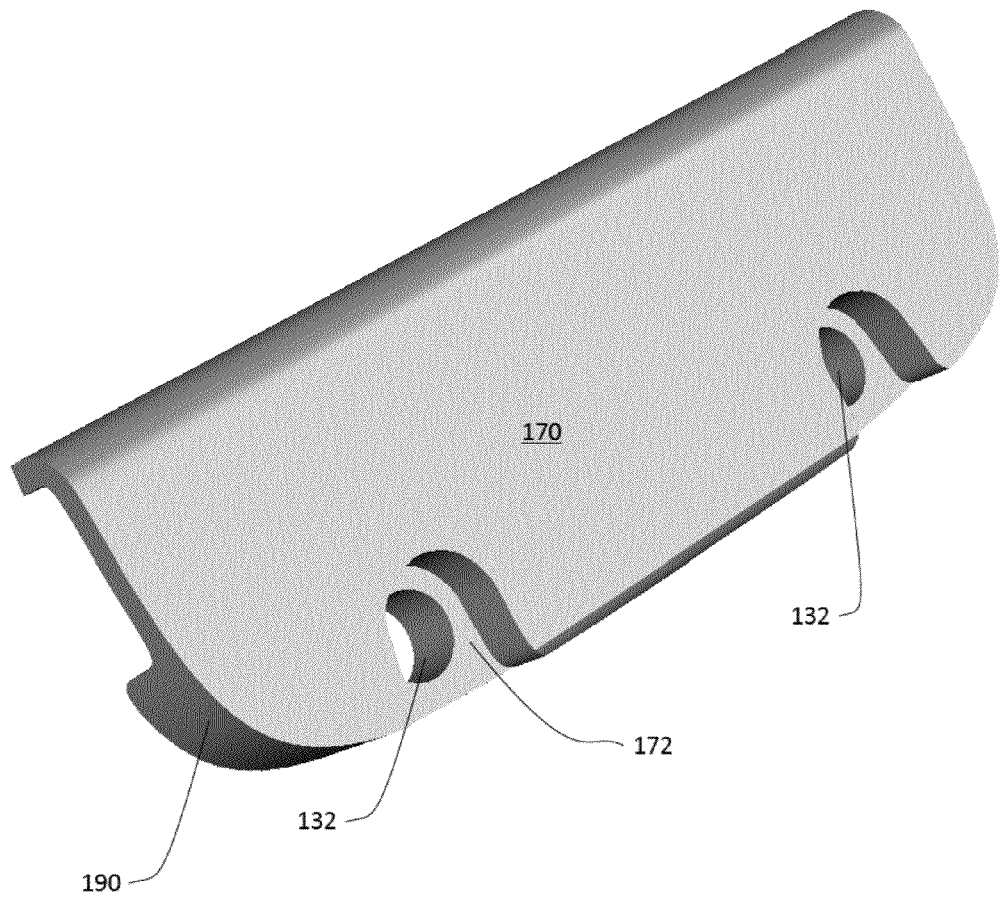

FIGS. 2A-C illustrate a front perspective view, side view, and rear perspective view of a retention member 120 according to one aspect of the disclosure. The retention member 120 may include a lens mounting surface 130 for receiving the lenses 102 and may also include a channel 140 for receiving a portion of a head-wearable device. The retention member may also have a top surface 150, a bottom surface 160, a rear surface 170, and a pair of side surfaces 180 and 190.

The retention member 120 may include a lens mounting surface 130 and a pair of apertures 132 for attachment with the lenses 102. In this regard, the lenses 102 may be placed adjacent to the lens mounting surface 130 such that apertures of the lenses align with corresponding apertures 132 of the lens mounting surface. Fixation elements 114 may then be secured through the corresponding apertures, allowing the lenses 102 to be removably secured to the lens mounting surface 130. The lens mounting surface 130 may be curved to conform to the shape of a corresponding portion of the lens surface 106 of the lenses 102. The curvature of the lens mounting surface 130 may be any type of curvature depending on the shape of the lenses 102. In this example, the lens mounting surface may be convexly curved with respect to a first plane, e.g., a plane that is parallel to a plane formed by the rear surface 170 and extending through both side surfaces 180 and 190. In this example, a width of the retention member 120 between the lens mounting surface 130 and the rear surface 170 may vary at different points between the side surfaces 180 and 190. For example, a width measured at a midpoint between side surfaces 180 and 190 may be greater than a width as measured at either of the side surfaces 180 and 190. In one implementation, the width of the retention member between the lens mounting surface 130 and rear surface 170 may be approximately 0.05 inches to 0.15 inches, e.g., 0.05 inches to 0.15 inches+/−0.05 inches. The curvature of the lens mounting surface 130 may be any type of curvature, such as curvature of constant radius of curvature, or a surface having distinct portions with distinct radii of curvature. In another example, both the lens mounting surface 130 and the rear surface 190 can be curved in a similar manner to the curvature described above with lens mounting surface 130.

The lens mounting surface 130 may include a plurality of apertures 132 formed therethrough for receiving fixation elements 114. The apertures 132 may have a substantially circular cross-section in a plane parallel to the rear surface 170. In one example, the apertures 132 can be threaded. The apertures 132 may extend between the lens mounting surface 130 and the rear surface 170 and may each have a central axis that is substantially parallel to the central axis of the other aperture. The apertures may each be equidistant from a respective one of the side surfaces 180 and 190 and may also be equidistant from a midpoint of the lens mounting surface 130. In another implementation, the lens mounting surface 130 may include one aperture 132. In this example, the aperture 132 may be centrally formed at a midpoint of the lens mounting surface 130 with respect to side surfaces 180 and 190. In one example, apertures 132 can be configured to receive screws, or bolts either by a threaded engagement or by permitting screws to push therethrough to threadably engage with separate nuts (not shown). In another example, apertures 132 can be configured to receive snap or press-fit elements that can be attached with or integrally formed with lenses 102. In another arrangement, retention member can include snap or press-fit elements extending from surface 130 that can removably attached with apertures in lenses 102.

The retention member 120 may include a channel 140 formed therein for receiving a portion of a head-wearable device. The channel 140 may be defined in part by a plurality of sidewalls 142, 144, and 146 and may be disposed between a lip 148 and the lens mounting surface 130.

The sidewall 142 may extend between the lens mounting surface 130 and the sidewall 144 and lengthwise between the side surfaces 180 and 190. The sidewall 142 may transition smoothly to lens mounting surface 130, such as by a radius or curve and may also adjoin the sidewall 144 in such a manner. In another example, the sidewall 142 may adjoin either or both of the lens mounting surface 130 and sidewall 144 along an edge. An intersection between the sidewall 142 and the lens mounting surface 130 may extend lengthwise along the retention member 120 between the side surfaces 180 and 190 and may be convexly curved with respect to the first plane. An intersection between the sidewall 142 and the sidewall 144 may also extend lengthwise along the retention member and may also be convexly curved with respect to the first plane. The sidewall 142 may be substantially planar or may include at least a portion thereof that is substantially planar. The sidewall 142 may also intersect the side surfaces 180 and 190 along an edge.

The sidewall 144 may extend between sidewalls 142 and 146 and may extend lengthwise between the side surfaces 180 and 190. The sidewall 144 may adjoin both the sidewalls 142 and 146 by a curved surface. The sidewall 144 may be convexly curved with respect to the first plane to conform to the shape of a headband of the head-wearable device. In this regard, a width of the retention member 120 between the sidewall 144 and rear surface 170 may be greater at a midpoint between the side surfaces 180 and 190 than a width at either of the side surfaces 180 and 190. In this regard, the width may gradually decrease from the midpoint to each of the side surfaces, respectively. The sidewall 144 may extend between the side surfaces 180 and 190 and may adjoin each by an angled edge.

The sidewall 146 may extend between the sidewall 144 and a lip 148 and may extend lengthwise between the side surfaces 180 and 190. The sidewall may intersect the lip 148 along an edge. The sidewall 146 may oppose the sidewall 142 and may be a substantially planar surface, or may include at least a portion thereof that is substantially planar. In this regard, at least a portion of the sidewall 146 may be parallel to at least a portion of the sidewall 142. The sidewall 146 may also include a projection 146a. The projection 146a may project toward the sidewall 142 from the sidewall 146 such that an opening width between the sidewalls 142 and 146 is smallest at the projection 146a. The channel width between the sidewalls 142 and 146 may be approximately 0.05 inches to 0.15 inches, e.g., 0.05 inches to 0.15 inches+/−0.05 inches. The channel depth between the sidewall 144 and a surface of the lens mounting surface 130 may be approximately 0.05 inches to 0.10 inches, e.g., 0.05 inches to 0.10 inches+/−0.05 inches. The projection 146a may have a height of approximately 0.01 inches to 0.03 inches, e.g., 0.01 inches to 0.03 inches+/−0.01 inches.

The lip 148 may extend between the sidewall 146 and the top surface 150 and may adjoin each by an angled edge. The lip may be convexly curved with respect to a plane extending between both side surfaces 180 and 190. The lip 148 may also extend between the side surfaces 180 and 190 and may adjoin each by a curved surface.

The top surface 150 may extend between the lip 148 and the rear surface 170. The top surface 150 may be substantially planar, but may include a portion 150a corresponding to the projection 146a. Like the projection 146a, the portion 150a may project toward the sidewall 142 such that a thickness of the lip 148 between the top surface 150 and sidewall 146 may be at a minimum at the portion 150a.

The bottom surface 160 may extend between the lens mounting surface 130 and the rear surface 170 and may extend lengthwise between the side surfaces 180 and 190. The bottom surface may adjoin the lens mounting surface 130 by an angled edge and may adjoin the side surfaces 180 and 190 by a curved surface. The bottom surface may be convexly curved with respect to a second plane that is perpendicular to the first plane, e.g., a plane that extends through the side surfaces 180 and 190 and is generally parallel to at least a portion of the sidewalls 142 and 146.

The rear surface 170 may extend between the top surface and bottom surface as well as the side surfaces. The rear surface may be substantially planar, or may have a portion thereof that is substantially planar or can be curved. The rear surface may have at least one recess 172 formed therein defined by a recess wall 174. The recess wall 174 may be substantially U-shaped and may overlap the apertures 132.

The side surfaces 180 and 190 may be mirror images of each other and may adjoin adjacent surfaces by an angled edge or a curved surface, according to the description above. The side surfaces may be substantially planar at a region adjacent the sidewalls 142-146 and may taper to a curved surface adjacent the bottom surface.

The retention member 120 may be formed of any material, such as a polymer, metal, etc. The retention member may have any dimension suitable for the purposes described herein, and in one example may have a height between a top surface 150 and bottom surface 160 of approximately 0.25 inches, a width between a lens mounting surface 130 and a rear surface 170 of 0.15 inches, and a length between side surfaces 180 and 190 of 0.75 inches.

Figure 3:
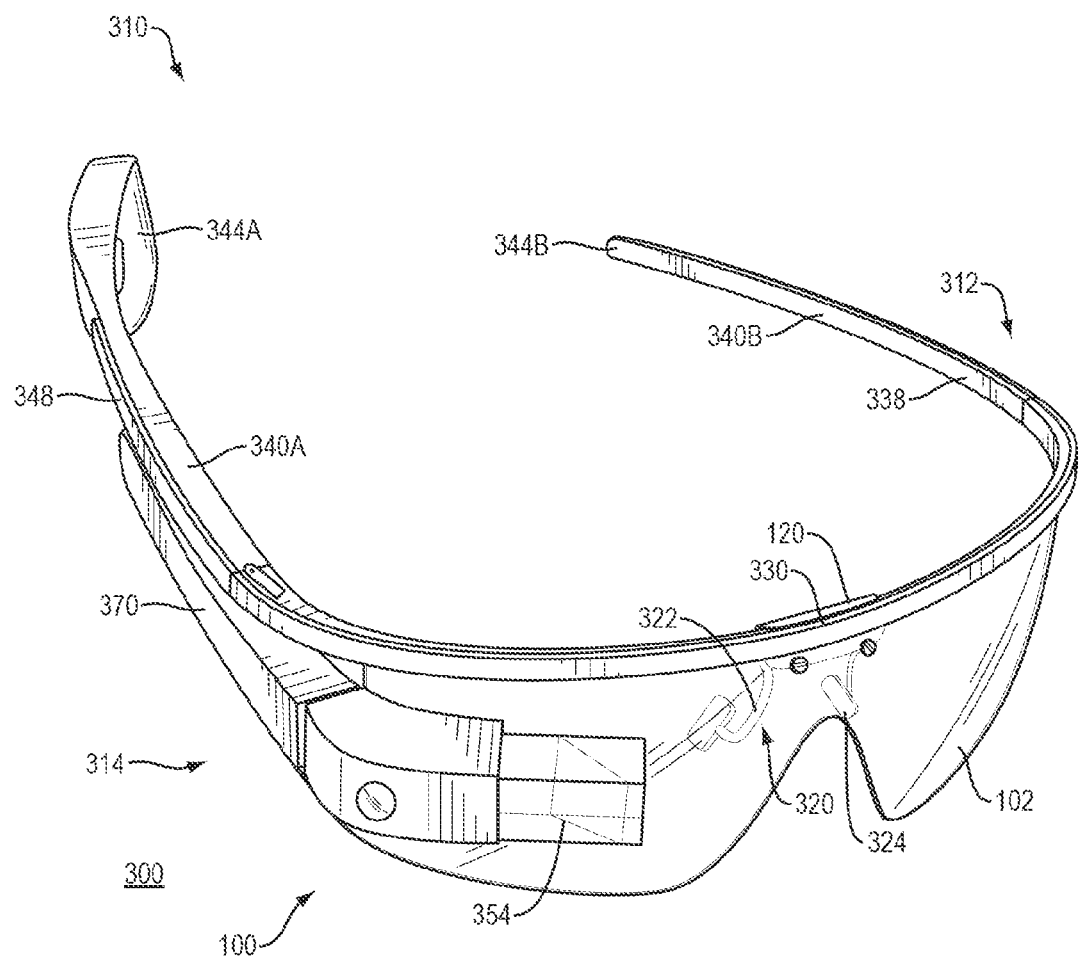
FIG. 3 illustrates a head-mounted device 300 with the lens system 100 assembled thereto according to one aspect of the disclosure

FIG. 3 illustrates a head-mounted device 300 with the lens system 100 assembled thereto according to one aspect of the disclosure. The system 300 is a wearable computing device configured to be wearable on the head of the user. As will be described in greater detail below, device 310 includes a band 312 that provides a desired fit of device 310 on a user's head. Device 310 further includes an extension arm 314 that extends from a portion of band 312 to a display end thereof that includes a display element 354. Extension arm 314 is configured such that, when device 310 is worn by a user, display 354 mounted on extension arm 314 can be positioned adjacent the user's eye, within the user's line of sight of at least that eye, for making an image presented thereon viewable by the user. In this manner, the extension arm 314 is configured to carry out at least one operation of the device 310, namely presenting an image to the user. Additional operations can also be carried out through extension arm 314, which can also include an input device in the form of a touch-based input that is accessible to the user to execute a touch input gesture to execute a control function of the device assembly 310 or a function of another electronic device that is connected or in communication with device assembly 410.

Band 312 is shown in FIG. 3 as including a central portion 330 with side arms 340A,340B extending away from opposite sides of the central portion 330. Central portion 330 includes nosepiece 320 configured to rest on the nose of a wearer with the central portion 330 providing a central support for side arms 340A,340B, which can extend unitarily therefrom, or can at least appear to extend unitarily therefrom, with an area of transition between the central portion 330 and the side arms 340A,340B including a bend or curve therebetween. In this example, the nosebridge 320 is disposed on the lens surface 106 side of the lenses 102. Nosebridge 320 can include a pair of bridge arms 322 that extend from the central portion 330. In the view of the embodiment of device assembly 310 shown in FIG. 3, bridge arms 322 extend in a downward direction from central portion 330. The orientation of device assembly 310 shown in FIG. 3 generally corresponds to the orientation of device 310 when being worn by a user when the user's head is in a neutral, upright position. The description of bridge arms 322 extending downward from central portion 330 is made in such a reference frame and is done for purposes of the present description. Discussion of any other relative reference directions is also made for similar purposes and none are intended to be limiting with respect to the present disclosure, unless explicitly stated.

Bridge arms 322 can include respective pads 324 thereon, which can be positioned to rest on parts of the nose of the wearer. Pads 324 can be made of a material that is softer than arms 322 for purposes of comfort. Additionally, the material that pads 324 are made from can be flexible or have a texture that prevents slippage along the surface of the user's nose. Bridge arms 322 can be flexible to further provide a comfortable fit and or grip on the user's nose. Further, bridge arms 322 can be bendable and repositionable so that the position of pads 324 can be changed to best fit the user. This can include movement closer together or farther apart or fore and aft relative to central portion 330, which can adjust the height of central portion 330 and, accordingly, the position of extension arm 314 and its display 354 relative to the user's eye.

Further adjustment of display and other structures thereof can be similar to those in the embodiments described above, as can the structures used to affix extension arm 314 to band 312. In other embodiments, structures similar to arms and pads can be integrally formed with central portion 330 and can be structured such that larger or smaller areas of the nosebridge 320 contact the nose of the user, compared to the embodiment shown. Accordingly, device 310 can be worn on a user's head such that nosepiece 320 can rest on the user's nose with side arms 340A,340B extending over respective temples of the user and over adjacent ears. The device 310 can be configured, such as by adjustment of bridge arms 322 or display element 354 to ensure the display element 354 is appropriately positioned in view of one of the user's eyes. In one position, device 310 can be positioned on the user's head, with bridge arms 322 being adjusted to position display 354 in a location within the user's field of view, but such that the user must direct her eyes upward to fully view the image on the display.

Side arms 340A,340B can be configured to contact the head of the user along respective temples or in the area of respective ears of the user. Side arms 340A,340B include respective free ends 344A,B opposite central portion 330. Free ends 344A,B can be positioned to be located near the ear of a user when wearing device 310. The center portion 430 and side arms 340A,340B may generally have a "U" shape. In this example, the U shape is asymmetric. The asymmetry is due, in part, to the different configurations of the free ends 344A,344B of the side arms 340A,340B. As shown, free end 344A may be enlarged to house circuitry and/or a power supply (e.g., removable or rechargeable battery) for the system 300. The configurations of the two free ends may be switched so that free end 344B houses circuitry and/or power supply equipment.

Band 312 can be configured to resiliently deform through a sufficient range and under an appropriate amount of force to provide a secure fit on user's heads of various sizes. In an example, band 312 is configured to comfortably and securely fit on at least about 90% of adult human heads. To accomplish this, as illustrated in FIG. 9, band 312 can be structured to elastically deform (or resiliently deform) such that the distance between free ends 444A and 444B can increase under force from an initial, or unflexed distance by at least 40% and up to about 50% to a flexed distance. The original distance between free ends 344A and 344B can be configured to be undersized relative to the smallest head size that band 312 is intended to be worn on such that distance will increase at last somewhat (for example, by about 5%) so that the flexing of free ends 344A and 344B away from each other when worn even by users having small head sizes causes some pressure to be applied to the sides of the user's head. In an example, band 312 can be configured such that it conforms to fit on a user's head by flexing laterally of central 330, and further such that central portion 330 does not substantially deform during such flexing. Accordingly, by structuring attachment member 120 to attach to band 312 along central portion 330, as described further below, lens system 100 can be made resistant to becoming dislodged or detached from bound 312 during flexing of bound 312.

Additionally, band 312 can be structured, such as by configuration thereof to a sufficient spring coefficient, such that when band 312 is expanded to fit a user of a relatively large head size, the pressure applied to the sides of the user's head by band 312 is not too great so as to cause pain while being worn or to make device 310 difficult to don or doff. Different materials having certain characteristics can be used in different forms to give the desired flex characteristics of band 312. In one example band 312 can have a spring coefficient for expansion, as described above, of between about 0.005 and 0.02 N/mm or, in another example, of about 1/100 N/mm. Given an exemplary spring coefficient, a band 312, as described above can expand from an initial distance $496_1$ of about 156 mm to about 216 mm by a force of between about 0.3 N and 1.2 N. In another example, such expansion can be under a force of about 0.6 N.

Band 312 can be configured to include a compliant inner portion 338 and a resilient outer portion 348. Inner portion 338 can include any portions of the band 312 that are intended to contact the user's head. In the particular embodiment shown, inner portion 338 can define the entire inner surface of band 312 to ensure that the compliant material of inner portion makes contact with the user's head regardless of the area of band 312 along which contact is made with the user's head. Inner portion 338 can be made of any material that can provide a degree of compliance to enhance the comfort of the fit of band 312 on the user's head while being able to retain its general shape. Acceptable materials include various foams, such as foam rubber, neoprene, natural or synthetic leather, and various fabrics. In an embodiment, inner portion 430 is made of an injection-molded or cast TPE. Inner portion 430 can also be made from various types of Nylon, including for example, a polyamide nylon such as Grilamid TR90. The compliance of the material of inner portion 338 can be measured by the durometer of the material. In an example, inner portion 338 can be made from a TPE having a durometer of between 30 and 70. Inner portion 338 can also be formed having a hollow passage therethrough or a channel formed therein opposite the inner surface. Such a passage or channel can be used to route any wiring associated with extension arm 314. For example, as discussed above a battery can be housed in enlarged free end 344A of band 312 that can be connected with the internal components of extension arm 314 to provide power therefor. This connection can be made by wired routed through a channel or hollow passage through inner portion 438.

Outer portion 348 of band 312 can be made of a resiliently flexible material such as metal or plastic. In general, the nature of such a material should be such that outer portion 348 can maintain the desired shape for band 312 while allowing flexibility so that band 312 can expand to fit on a user's head while applying a comfortable pressure thereto to help retain band 312 on the user's head. Outer portion 348 can be elastically deformable up to a sufficiently high threshold that the shape of band 312 will not be permanently deformed simply by being worn by a user with a large head. Acceptable materials for outer portion 348 include metals such as aluminum, nickel, titanium (including grade 5 titanium), various steels (including spring steel, stainless steel or the like), or alloys including these and other metals. In another example, the outer portion 348, or the inner portion 338, may be formed of composite materials, such as carbon fiber reinforced polymer (CFRP). The thickness of outer portion 348 can be adjusted, depending on the material used, to give the desired flexibility characteristics. In an example, the desired fit and flexibility characteristics for band 312, discussed above, can be achieved using grade 5 titanium at a thickness of between about 0.8 mm and 1.8 mm for outer portion 348.

Inner portion 338 can have a profile such that it at least partially fits within a channel formed by outer portion 348. In an example inner portion 338 can be sized to fit within a channel formed by a generally U-shaped cross-sectional profile of outer portion 348. Such a channel can be configured to also accept any wiring of band 312 therein or to close a partially open channel formed in an inner portion to hold such wiring.

Figure 4A:
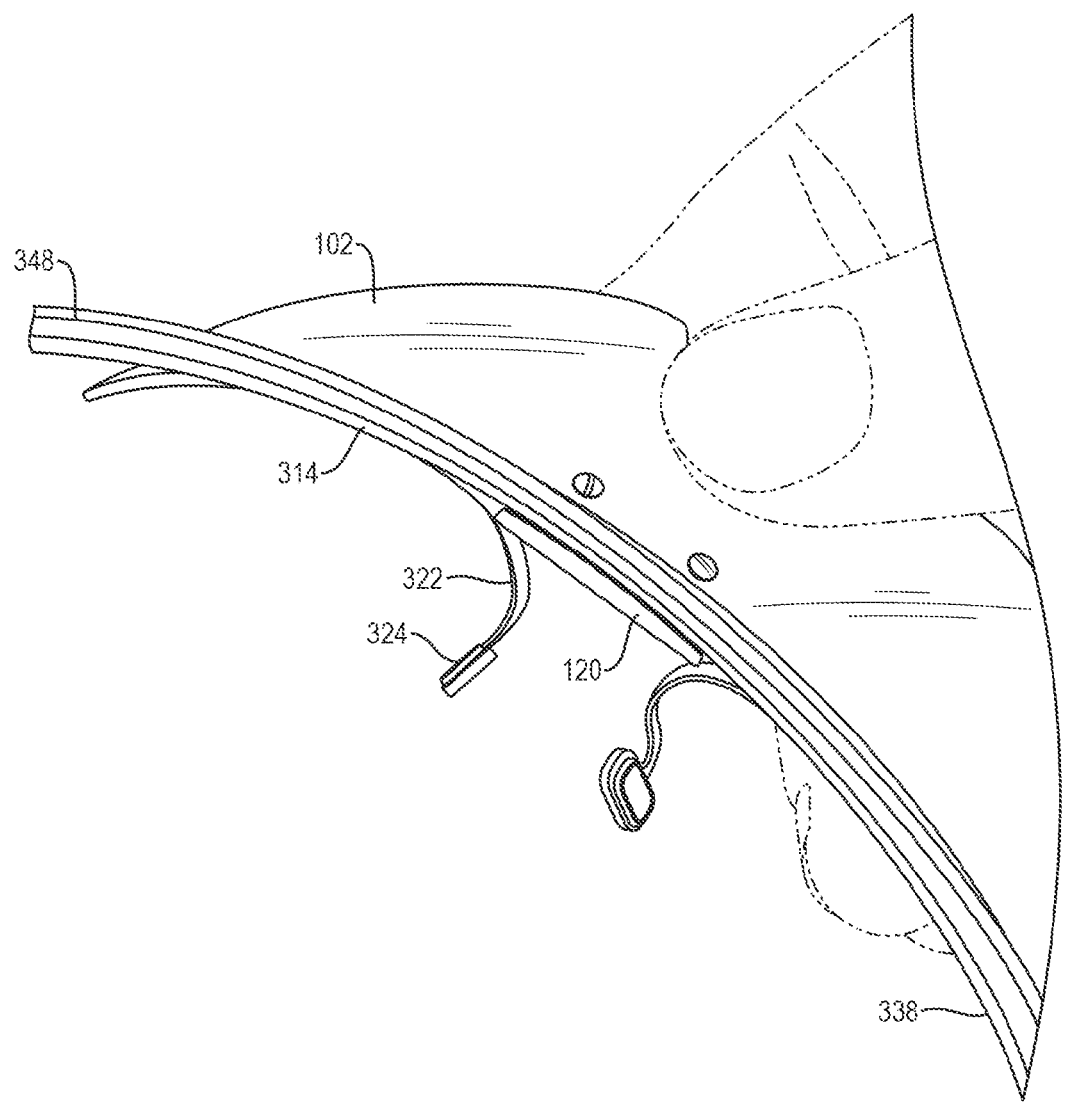
FIGS. 4A and 4B illustrate assembly of the removable lenses 100 with a head-mounted device according to one aspect of the disclosure
Figure 4B:
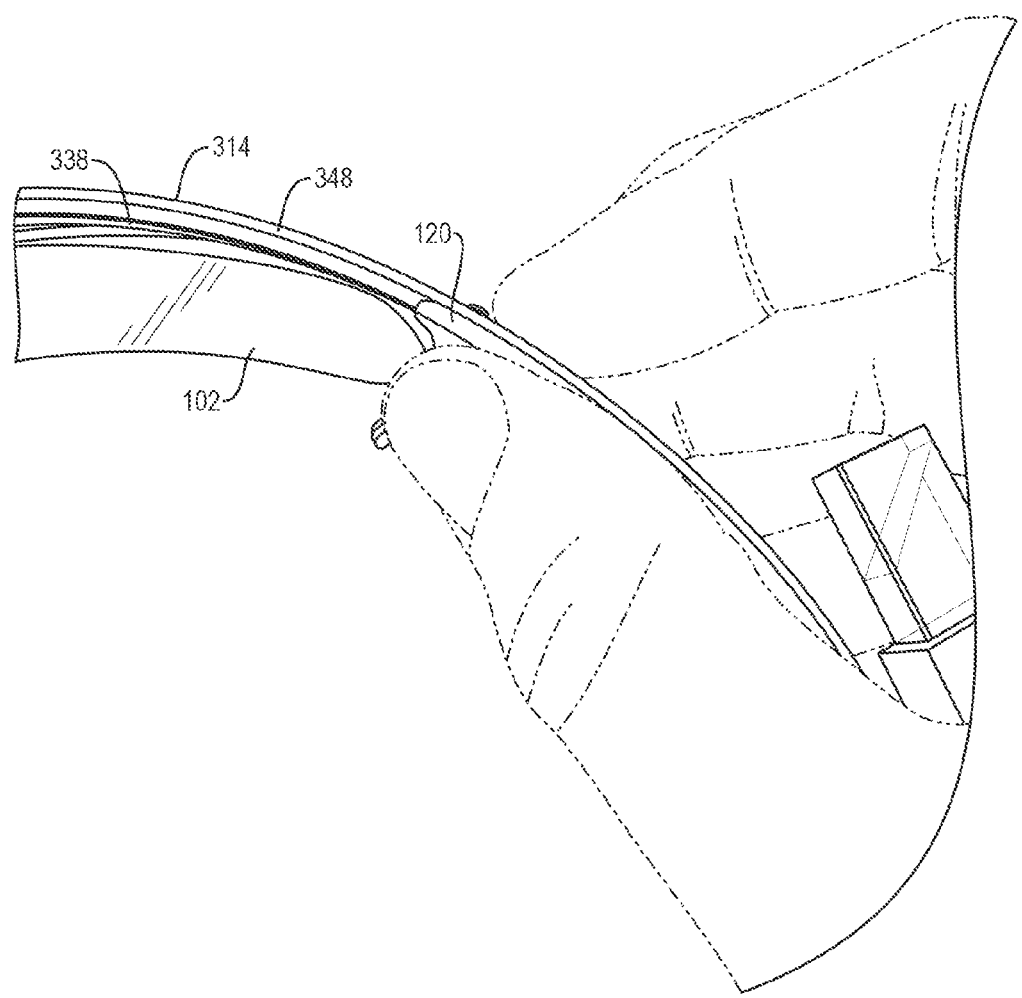

FIGS. 4A and 4B illustrate assembly of the removable lenses 100 with a head-mounted device according to one aspect of the disclosure. As shown in FIG. 4A, the lens system 100 may be advanced toward the head wearable device 300. In particular, the lens system 100 may be advanced toward the head wearable device 300 at a predetermined angle with respect to the neutral position of the lens system 100 when worn by a user. For example, the angle may range from 0 to 90 degrees, and in particular may be from 30 degrees to 75 degrees. Such an angled approach can facilitate assembly of lens system 100 onto band 312 while being worn by a user. At the predetermined angle, the headband of the wearable device may be received in the channel 140. In this position, the channel 140 may be adjacent to both the inner portion 338 and outer portion 348, while the channel 140 may be adjacent to the inner portion 338 and the sidewall 146 may be adjacent to the outer portion 348. To ensure a secure fit, the channel 140 may be sized to cause a resilient portion of the band to deform, exerting a gripping force on the sidewalls of the channel 140. Once the headband is secured within the channel 140, the lens system 100 may be rotated about an axis longitudinally defined by the channel 140 to the position shown in FIG. 4B. In this regard, the lens system 100 may be rotated from the predetermined angle to the neutral position. During rotation, the channel 140 may rotate about the band 312. Once rotated to the neutral position, the sidewalls 142-146 may engage with the inner portion 338 of the band. Additionally, the projection 148a may engage with a gap or transition area between the inner portion 338 and outer portion 348. As discussed above, the inner portion may be resilient and may deform upon engagement with the channel 140.

The lens system 100 may be disposed between the eye of a user and the display element 354 when worn by the user. In this regard, the lens system 100 may serve as a eye protection from foreign objects, such as footballs, soccer balls, debris, or any other object. Additionally, the lens system 100 may serve to protect the user's eye from the display object in the event of mechanical failure, such as disattachment of the display element 354 or breaking or shattering of the display element 354.

According to another implementation, the channel 140 may have an insert disposed therein. In this example, the insert may be formed of a polymer and may deform slightly upon engagement with the band. In this regard, the deformation of both the band and the insert may ensure a secure fit.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A lens system, comprising:
a retention member, comprising:
  a lens mounting surface including an aperture formed therethrough, the lens mounting surface extending between a first side surface and a second side surface and being convexly curved with respect to a plane intersecting the first side surface and the second side surface; and
  a channel defined in part by a first sidewall, a second sidewall, and a third sidewall, the first sidewall and third sidewall being opposed to each other and the second sidewall being convexly curved with respect to the plane intersecting the first side surface and the second side surface, wherein the first sidewall, the second sidewall, and the third sidewall extend lengthwise through the retention member, defining a first cutout in the first side surface and a second cutout in the second side surface; and
a lens contacting the lens mounting surface and removably attached to the retention member at the aperture.

2. The lens system of claim 1, wherein the aperture further comprises a plurality of apertures.

3. The lens system of claim 2, wherein each of the plurality of apertures is disposed at an equal distance from a respective one of the first side surface and the second side surface.

4. The lens system of claim 1, wherein a portion of the first sidewall is substantially planar.

5. The lens system of claim 4, wherein a portion of the third sidewall is substantially planar.

6. The lens system of claim 5, wherein the portions of the first and third sidewall that are substantially planar are substantially parallel to each other.

7. The lens system of claim 1, wherein the retention member further comprises an insert disposed at least partially within the channel.

8. The lens system of claim 1, wherein the retention member further comprises a lip adjacent to one of the first sidewall and the third sidewall.

9. The lens system of claim 8, wherein the lip is convex with respect to a plane extending through the first side surface and the second side surface.

10. The lens system of claim 1, wherein one of the first sidewall and the third sidewall comprises a projection such that an opening distance between the first sidewall and third sidewall is at a minimum at a location along the projection.

11. The lens system of claim 1, wherein the lens mounting surface is configured to extend along a surface of the lens in continuous contact therewith.

12. The lens system of claim 1, wherein the system is configured for assembly with a head wearable device having a band, the system being configured for such assembly by attachment of the retention member to the band such that a portion of the band is received with the channel of the retention member.

13. The lens system of claim 12, wherein the head wearable device further comprises a display attached to the band, and wherein the lens is positionable between an eye of a user and the display when the head wearable device is being worn by a user.

14. The lens system of claim 13, wherein the display is affixed to the band by an extension arm attached between the band and the display, and wherein the lens further comprises a cutout portion configured to at least partially surround the extension arm.

15. The lens system of claim 12, wherein the band includes a central portion disposed therealong with two side arms extending laterally therefrom, and wherein the retention member is configured to receive the band at the central portion.

16. The lens system of claim 15, wherein the central portion includes an inner surface that is curved in a direction of the side arms, and wherein the second sidewall of the channel of the retention member is convexly curved so as to match the curve of the inner surface of the band when the band is received within the channel.

17. The lens system of claim 15, wherein the central portion includes a nosepiece depending therefrom, wherein the head wearable device includes a display attached to one of the side arms of the band, and wherein the lens is positionable between the nosepiece and the display when the retention member is attached with the band.

18. The lens system of claim 1, further comprising a fixation element configured to be received within the aperture to secure the lens to the lens mounting surface.

19. A retention member for a lens system, comprising:
   a lens mounting surface including an aperture formed therethrough, the lens mounting surface extending between a first side surface and a second side surface and being convexly curved with respect to a first plane normal to the aperture; and
   a channel defined in part by a first sidewall, a second sidewall, and a third sidewall, the first sidewall and third sidewall being opposed to each other and the second sidewall being convexly curved with respect to the first plane, wherein the first sidewall, the second sidewall, and the third sidewall extend lengthwise through the retention member, defining a first cutout in the first side surface and a second cutout in the second side surface.

20. The retention member of claim 19, wherein the retention member is configured for removable attachment with a lens using the aperture thereof and such that that lens contacts the lens mounting surface, the retention member further configured to attach to a head wearable device having a band, the retention member being configured for such attachment such that a portion of the band is received with the channel of the retention member.

21. The retention member of claim 20, wherein the band includes a central portion disposed therealong with two side arms extending laterally therefrom, and wherein the channel of the retention member is configured to receive the band at the central portion.

* * * * *